US012708825B2

(12) United States Patent
Li

(10) Patent No.: US 12,708,825 B2
(45) Date of Patent: Aug. 18, 2026

(54) LIGHT-EMITTING STRUCTURE OF PADDLE

(71) Applicant: Banglin Li, Shenzhen (CN)

(72) Inventor: Banglin Li, Shenzhen (CN)

( * ) Notice: Subject to any disclaimer, the term of this patent is extended or adjusted under 35 U.S.C. 154(b) by 372 days.

(21) Appl. No.: 18/517,709

(22) Filed: Nov. 22, 2023

(65) Prior Publication Data

US 2024/0149123 A1 May 9, 2024

(30) Foreign Application Priority Data

Feb. 22, 2023 (CN) ........................ 202320330048.3

(51) Int. Cl.

*A63B 59/42* (2015.01)
*F21L 4/08* (2006.01)
*F21V 21/40* (2006.01)
*F21V 23/00* (2015.01)
*F21V 23/04* (2006.01)
*F21V 33/00* (2006.01)
*F21Y 103/10* (2016.01)
*F21Y 113/13* (2016.01)

(52) U.S. Cl.

CPC ................ *A63B 59/42* (2015.10); *F21L 4/08* (2013.01); *F21V 21/406* (2013.01); *F21V 23/009* (2013.01); *F21V 23/0421* (2013.01); *F21V 33/008* (2013.01); *A63B 2225/74* (2020.08); *F21Y 2103/10* (2016.08); *F21Y 2113/13* (2016.08)

(58) Field of Classification Search

CPC ......... A63B 59/40; A63B 59/42; A63B 59/45; F21V 33/008; F21V 23/0421

See application file for complete search history.

(56) References Cited

U.S. PATENT DOCUMENTS

| | | | | |
|---|---|---|---|---|
| 8,827,848 | B1 * | 9/2014 | Washburn ............ | A63B 67/187 473/473 |
| 2004/0152544 | A1 * | 8/2004 | Lammer ................ | A63B 60/54 473/520 |
| 2018/0104555 | A1 * | 4/2018 | Taylor .................... | A63B 59/45 |
| 2024/0226677 | A1 * | 7/2024 | Matt ...................... | A63B 43/06 |

FOREIGN PATENT DOCUMENTS

| | | | |
|---|---|---|---|
| CN | 210448024 U | * | 5/2020 |
| IT | 202100006512 A1 | * | 9/2022 |
| TW | M566094 | * | 9/2018 |

OTHER PUBLICATIONS

Machine Translation of CN 210448024 (Year: 2020).*
Machine Translation of IT 202100006512 (Year: 2022).*
Machine Translation of Tw M566094 (Year: 2018).*

* cited by examiner

*Primary Examiner* — Brian O Peters

(57) ABSTRACT

Disclosed is a light-emitting structure of a paddle, including a paddle body, and the paddle body includes a paddle plate assembly and a handle mounted below the paddle plate assembly; a paddle plate is arranged in the middle of the paddle plate assembly, a light-transmitting or light-proof flexible lampshade is arranged on a side of the paddle plate, and the flexible lampshade extends to the bottoms on both sides of the handle; and a mounting groove is formed on an inner side surface of the flexible lampshade, and a flexible light-emitting assembly is mounted in the mounting groove.

10 Claims, 7 Drawing Sheets

LIGHT-EMITTING STRUCTURE OF PADDLE

TECHNICAL FIELD

The present disclosure relates to the technical field of paddle lighting, and more particularly relates to a light-emitting structure of a paddle.

BACKGROUND

There are many types of paddles, such as the well-known table tennis paddles, badminton paddles, and pickleball paddles. Originated from the Bainbridge Island in Seattle, USA, pickleball is a type of sport that hits a ball with a paddle, and it would be appropriate to say that it is a hybrid sport of tennis, badminton and table tennis.

Pickleball is an outdoor leisure sport, and the paddles used by people are ordinary products without any light-emitting devices, therefore, it is very necessary to develop a a light-emitting structure of a paddle, so as to improve the user experience and atmosphere

SUMMARY

In order to overcome the above defects in the prior art, the present disclosure provides a light-emitting structure of a paddle to solve the problems mentioned in the background art.

In order to achieve the above objective, the present disclosure provides the following technical solution: including a paddle body, and the paddle body includes a paddle plate assembly and a handle mounted below the paddle plate assembly;

- the paddle plate assembly includes a paddle plate, a light-transmitting or light-proof flexible lampshade is arranged on a side of the paddle plate, and the flexible lampshade extends to the bottoms on both sides of the handle;
- a mounting groove is formed on an inner side surface of the flexible lampshade or a perimeter of the paddle plate, and a flexible light-emitting assembly is mounted in the mounting groove;
- the flexible light-emitting assembly includes a plurality of lamp beads, and the lamp beads are specifically configured as single-color lamp beads or multi-color lamp beads; and
- the handle includes an end cap and a switch body, the handle is provided with at least one battery cavity, and a battery is installed inside the battery cavity; the lamp beads on the flexible light-emitting assembly are lighted up by touching the switch body, making the entire paddle plate or the entire perimeter of the paddle plate shinning, which is very beautiful and cool.

Preferably, two sides of the handle are provided with slots.

Preferably, the paddle body further includes a circuit board mounted inside the handle, and the switch body, the battery, and the flexible light-emitting assembly are all electrically connected with the circuit board.

Preferably, the battery cavity can further be disposed on any side of the front or back of the paddle plate.

Preferably, the switch body is any one of a touch switch, a button switch, or a toggle switch.

Preferably, the handle is provided with a charging port.

Preferably, the switch body can further be disposed on any side of the front or back of the paddle plate.

Preferably, the paddle plate is made from any one of glass fiber, carbon fiber, wood, and plastic.

Preferably, the flexible light-emitting assembly is a light string, or a light panel, or a light strip with a certain degree of flexibility.

Preferably, a length of the flexible light-emitting assembly equals to or is less than that of the flexible lampshade.

The present disclosure has the beneficial technical effects and advantages:

In the present disclosure, the side of the paddle plate is provided with the flexible light-emitting assembly, the lamp beads on the flexible light-emitting assembly are lighted up by touching the switch body, making the entire paddle plate or the entire perimeter of the paddle plate shinning, which is very beautiful and cool; in addition, the flexible light-emitting assembly can be provided multi-color lamp beads, which makes the use of the product more cool at night and brings a better experience, and is conducive to strengthening market competition of the product.

Figure 1:
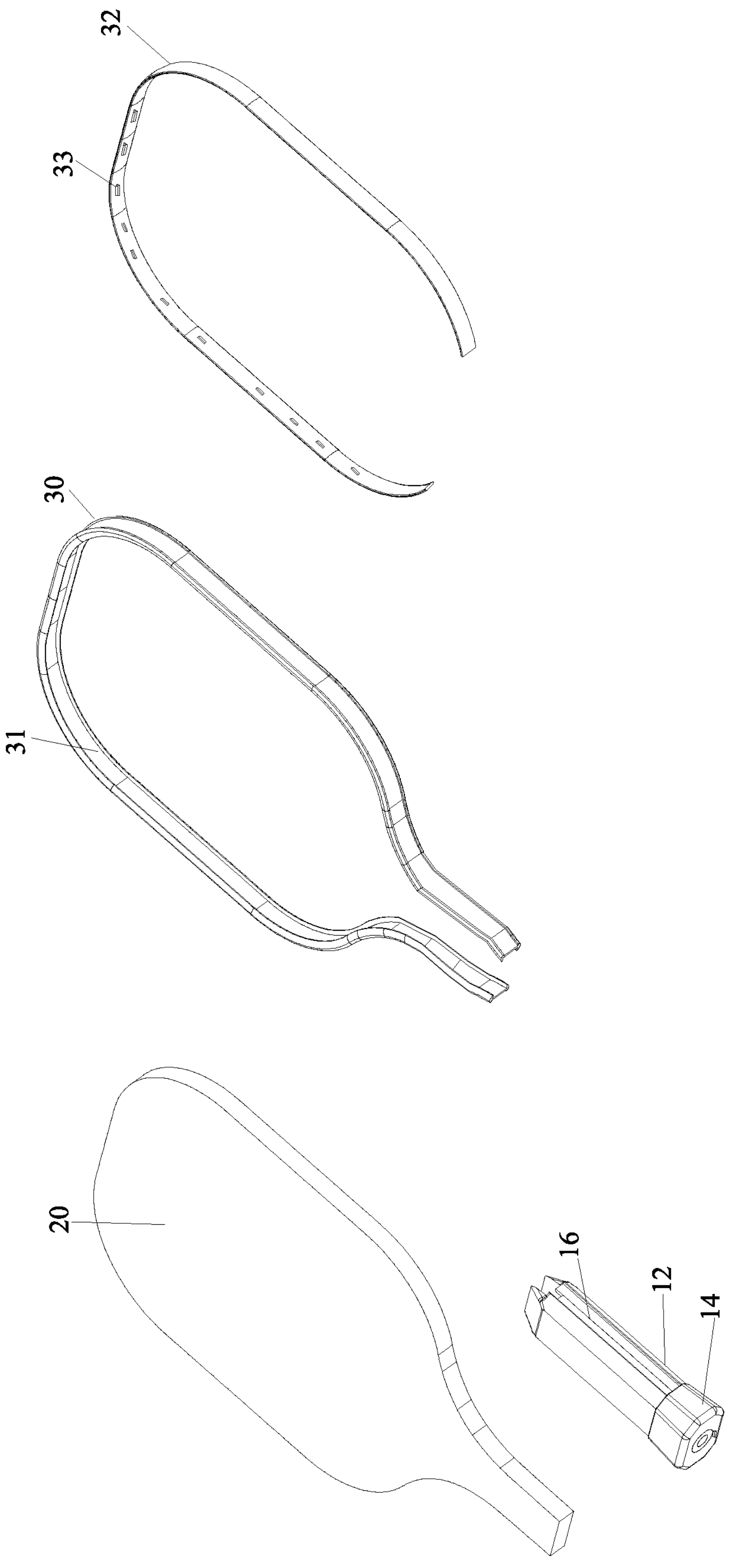
FIG. 1 is an exploded view of an overall structure of Embodiment 1 in the present disclosure.

In the accompanying drawings: 1. paddle body; 11. paddle plate assembly; 12. handle; 13. battery cavity; 14. end cap; 15. switch body; 16. slot; 17. charging port; 18. battery; 19. circuit board; 20. paddle plate; 30. flexible lampshade; 31. mounting groove; 32. flexible light-emitting assembly; and 33. lamp bead.

DETAILED DESCRIPTIONS OF THE EMBODIMENTS

The technical solutions in the embodiments of the present disclosure are clearly and completely described below in conjunction with the accompanying drawings in the embodiments of the present disclosure. Apparently, the embodiments described are merely some rather than all of the embodiments of the present disclosure. All the other embodiments obtained by those of ordinary skill in the art based on the embodiments in the present disclosure without creative efforts shall fall within the protection scope of the present disclosure.

The present disclosure will be further described below in conjunction with the accompanying drawings and specific embodiments:

Embodiment 1

The present embodiment provides a paddle light-emitting structure, as shown in FIGS. 1-4, including a paddle body 1, where the paddle body 1 includes a paddle plate assembly 11 and a handle 12 mounted below the paddle plate assembly 11; a paddle plate 20 is arranged in the middle of the paddle plate assembly 11, a light-transmitting or light-proof flexible lampshade 30 is arranged on a side of the paddle plate 20, and the flexible lampshade 30 extends to the bottoms on both sides of the handle 12; a mounting groove 31 is formed on an inner side surface of the flexible lampshade 30 or a perimeter of the paddle plate. In the present embodiment, the mounting groove 31 is formed on the inner side surface of the flexible lampshade 30, and a flexible light-emitting assembly 32 is mounted in the mounting groove 31; the flexible light-emitting assembly 32 includes a plurality of lamp beads 33, and the lamp beads 33 are specifically configured as single-color lamp beads or multi-color lamp beads. In the present embodiment, the flexible lampshade 30 is light-proof, the lamp beads 33 on the flexible light-emitting assembly 32 illuminate inwardly on the side of the paddle plate 20, the flexible lampshade 30 is snap-fitted on the paddle plate 20 by using the mounting groove 31, and then is sealed and fixed by means of glue, such that the overall airtightness is improved, and the flexible light-emitting assembly 32 inside is effectively protected to prevent it from water damage; the handle 12 includes an end cap 14 and a switch body 15, where the switch body 15 is arranged on the end cap 14 to prevent accidental touching of the switch body 15 during use, the end cap 14 is snap-fitted at the bottom of the handle 12, and is then fixed by means of glue or screws, the handle 12 is provided with at least one battery cavity 13, a battery 18 is installed inside the battery cavity 13, and the battery 18 is configured as a lithium battery capable of being recharged or an ordinary battery incapable of being recharged; in the present embodiment, the battery 18 can be a lithium battery capable of being recharged to make the product more economic and convenient, the paddle plate 20 can be made from glass fiber capable of guiding light, the lamp beads 33 on the flexible light-emitting assembly 32 are lighted up by touching the switch body 15, the light then illuminates through the paddle plate 20 and makes the entire paddle plate 20 shining, which is very beautiful and cool, and the paddle plate 20 is capable of guiding the light, making the light emitting more uniform without dazzling;

in such a way, in other embodiments, the flexible lampshade 30 can also be fixed by means of screws, the flexible lampshade 30 is made from light-transmitting material, and the lamp beads 33 on the flexible light-emitting assembly 32 illuminate outwardly on the inner side surface of the flexible lampshade 30, makes the entire flexible lampshade 30 to emit the light.

Further, two sides of the handle 12 are provided with slots 16, two ends of the flexible lampshade 30 that are in contact with the handle 12 are snap-fitted and fixed in the matching slots 16, such that the overall aesthetics of the product is improved and the fixation of the flexible lampshade 30 is more stable, and use of the flexible lampshade 30 and the flexible light-emitting assembly 32 are easy to be bent for assembly and adapt to different shapes of the paddle plate 20.

Figure 2:
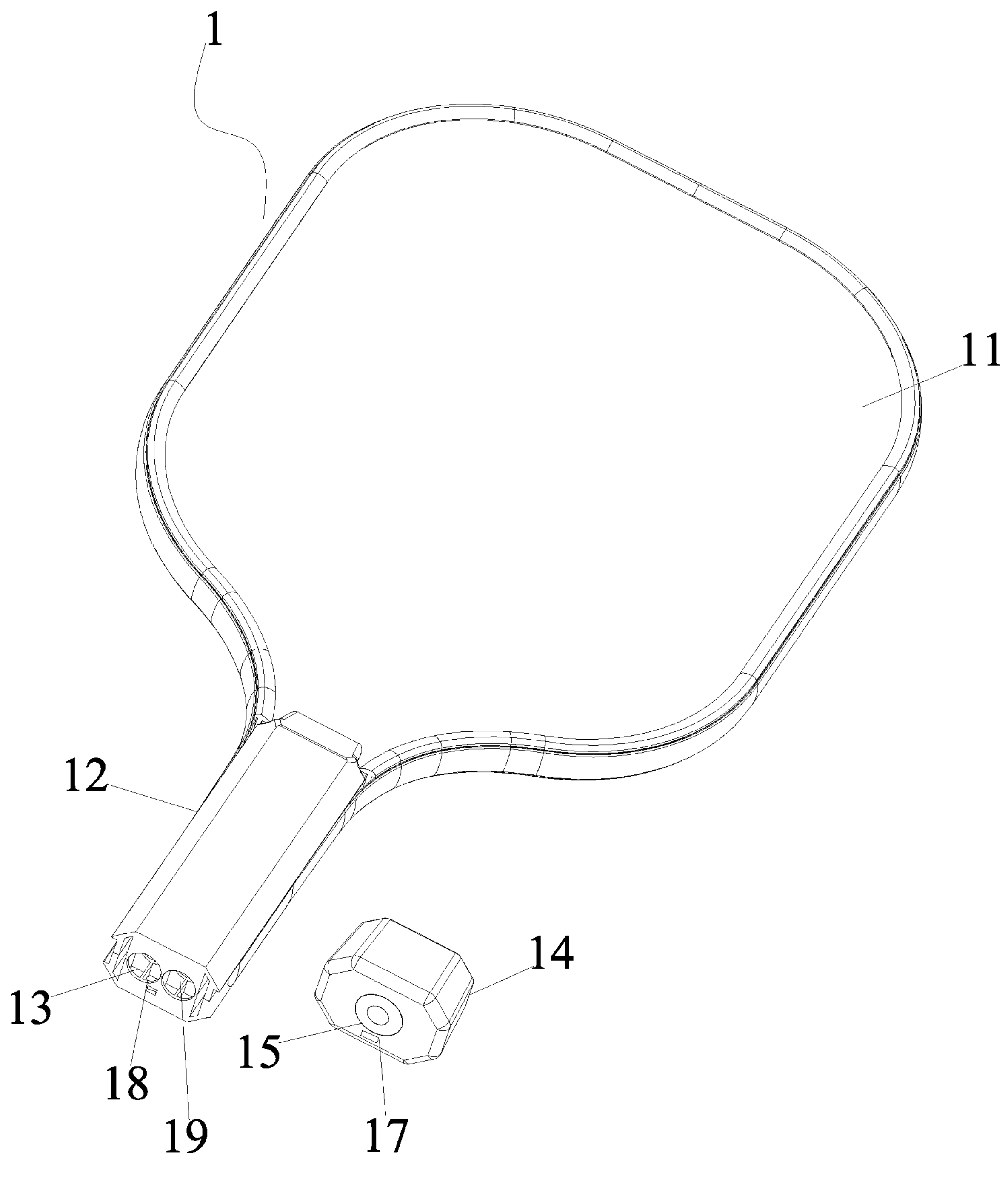
FIG. 2 is a structural schematic diagram of a battery cavity and an end cap of Embodiment 1 in the present disclosure.
Figure 3:
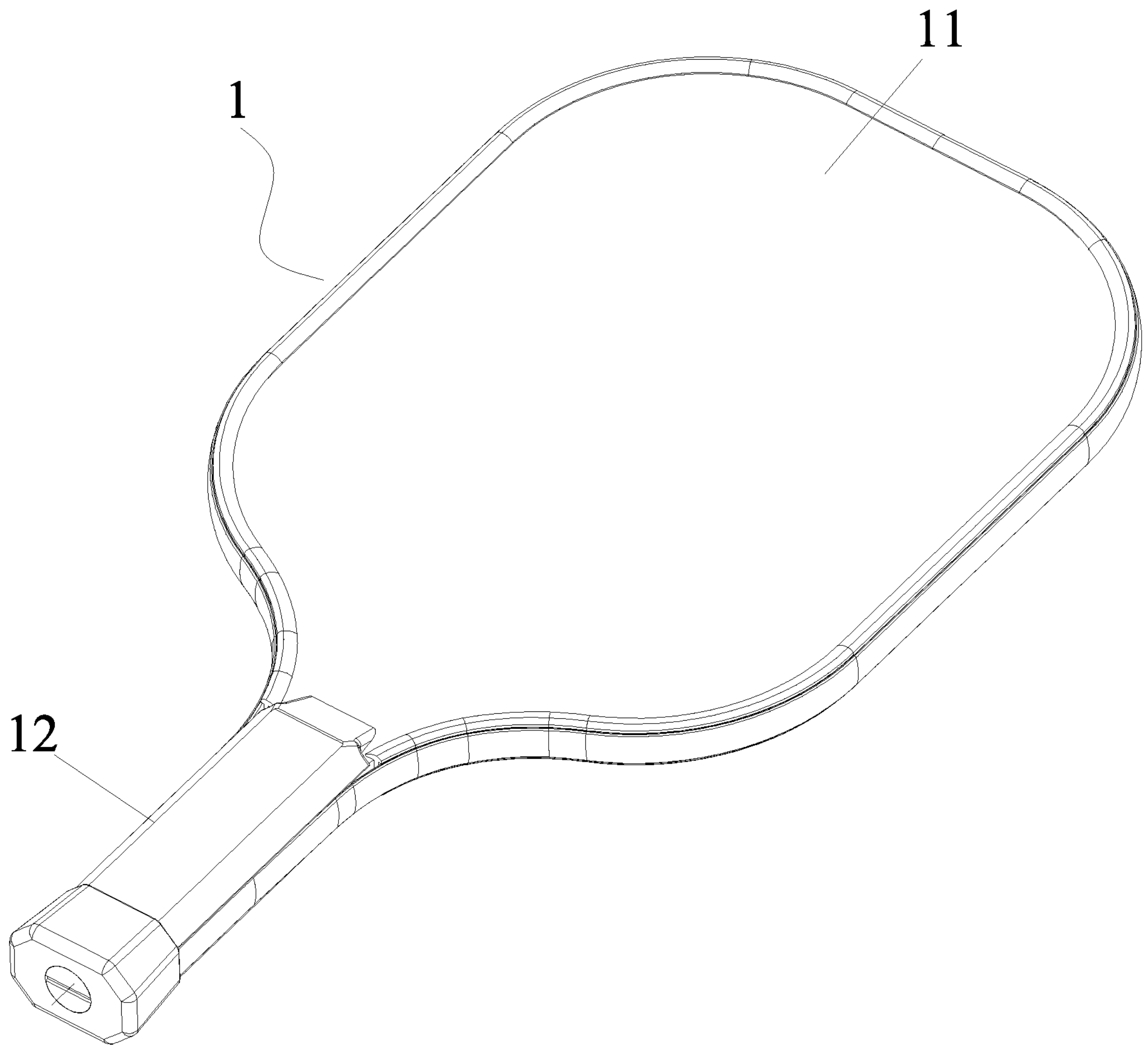
FIG. 3 is an overall structural schematic diagram of Embodiment 1 in the present disclosure.
Figure 4:
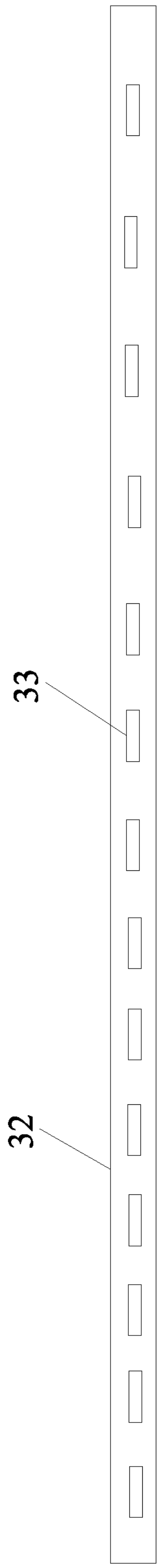
FIG. 4 is a structural schematic diagram of a flexible light-emitting assembly of Embodiment 1 in the present disclosure.

As shown in FIG. 2, the paddle body 1 further includes a circuit board 19 mounted inside the handle 12, the switch body 15, the battery 18, and the flexible light-emitting assembly 32 are all electrically connected with the circuit board 19, the handle 12 is provided with a charging port 17, the charging port 17 is arranged on one side of the switch body 15, where the battery 18 is recharged through the charging port 17, and the switch body 15 and the circuit board 19 are configured to control the switch and mode adjustment of the flexible light-emitting assembly 32.

In other embodiments, the battery cavity 13 can further be disposed on any side of the front or back of the paddle plate 20, and the switch body 15 can further be disposed on any side of the front or back of the paddle plate 20, so that the best assembly method can be selected to meet needs of different customers.

Further, the switch body 15 is any one of a touch switch, a button switch, or a toggle switch. In the present embodiment, the switch body 15 is a touch switch for better control of the flexible light-emitting assembly 32 and to achieve better waterproof effect.

Specifically, the flexible light-emitting assembly 32 is a light string, or a light panel, or a light strip with a certain degree of flexibility, and a length of the flexible light-emitting assembly 32 equals to or is less than that of the flexible lampshade 30. In the present embodiment, the flexible light-emitting assembly 32 is a light panel with a certain degree of flexibility, and a length of the light panel is less than that of the flexible lampshade 30 to facilitate better installation in the mounting groove 31.

Embodiment 2

Figure 5:
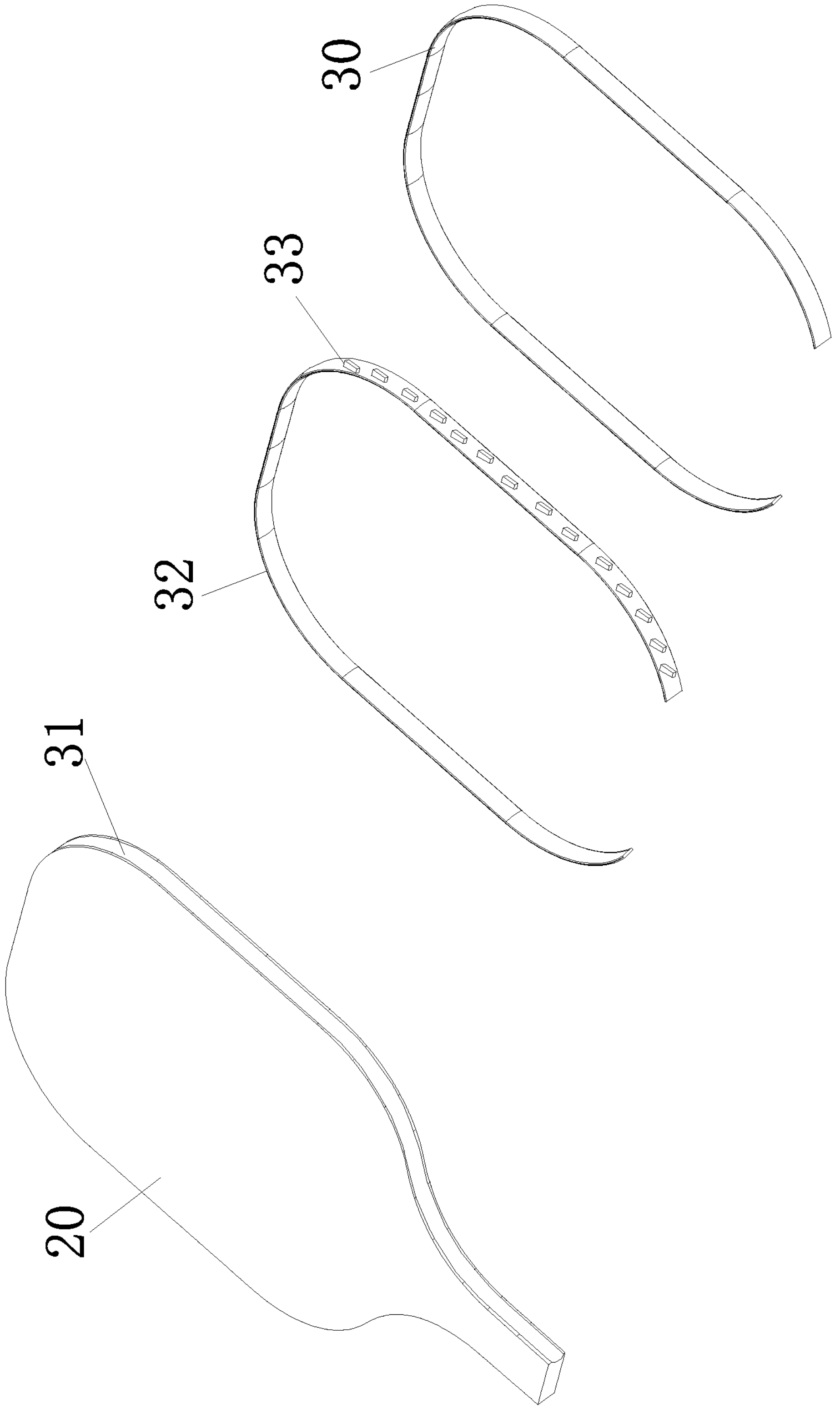
FIG. 5 is an exploded view of an overall structure of Embodiment 2 in the present disclosure.
Figure 6:
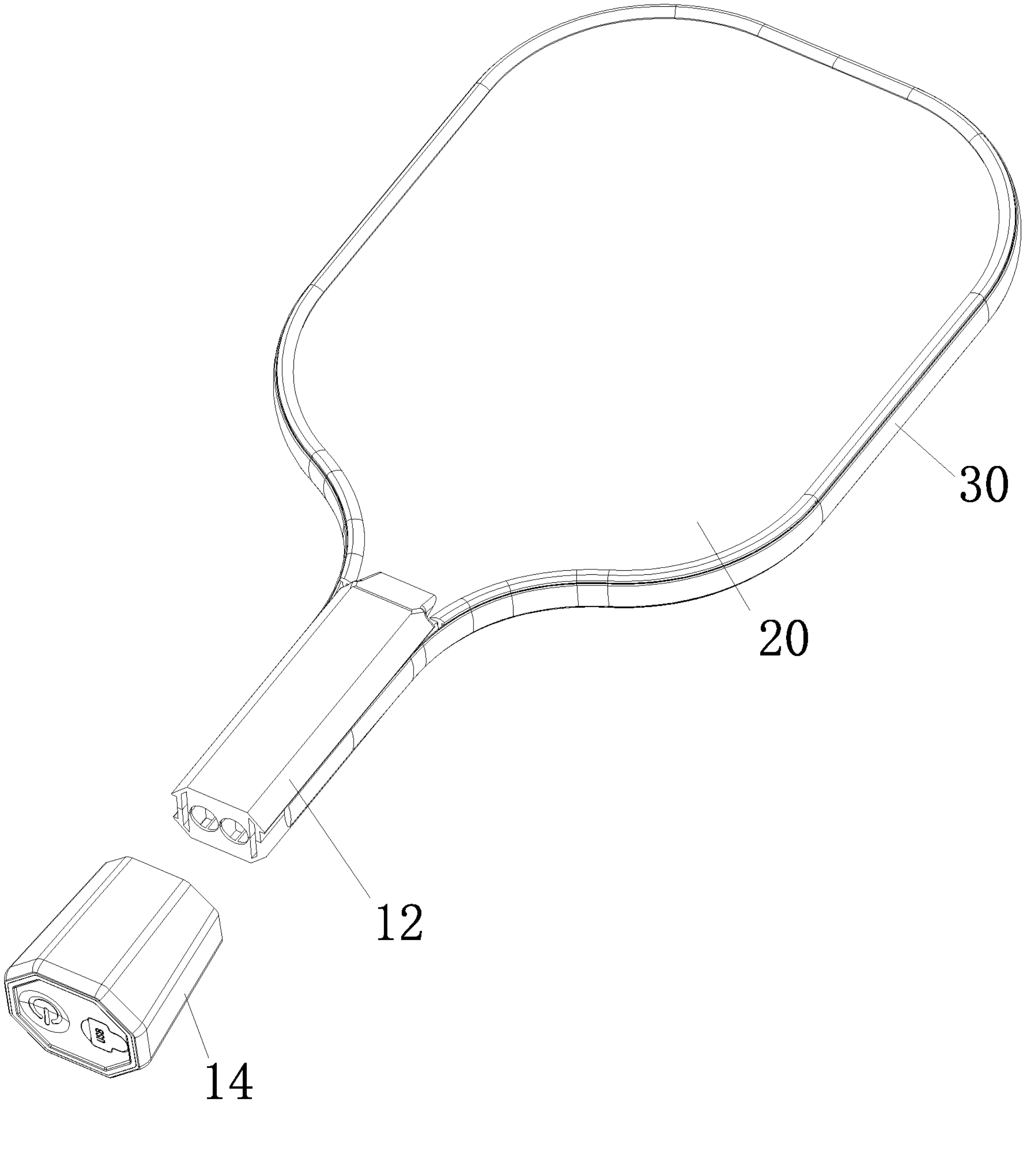
FIG. 6 is a schematic diagram of an end cap separation structure of Embodiment 2 in the present disclosure.
Figure 7:
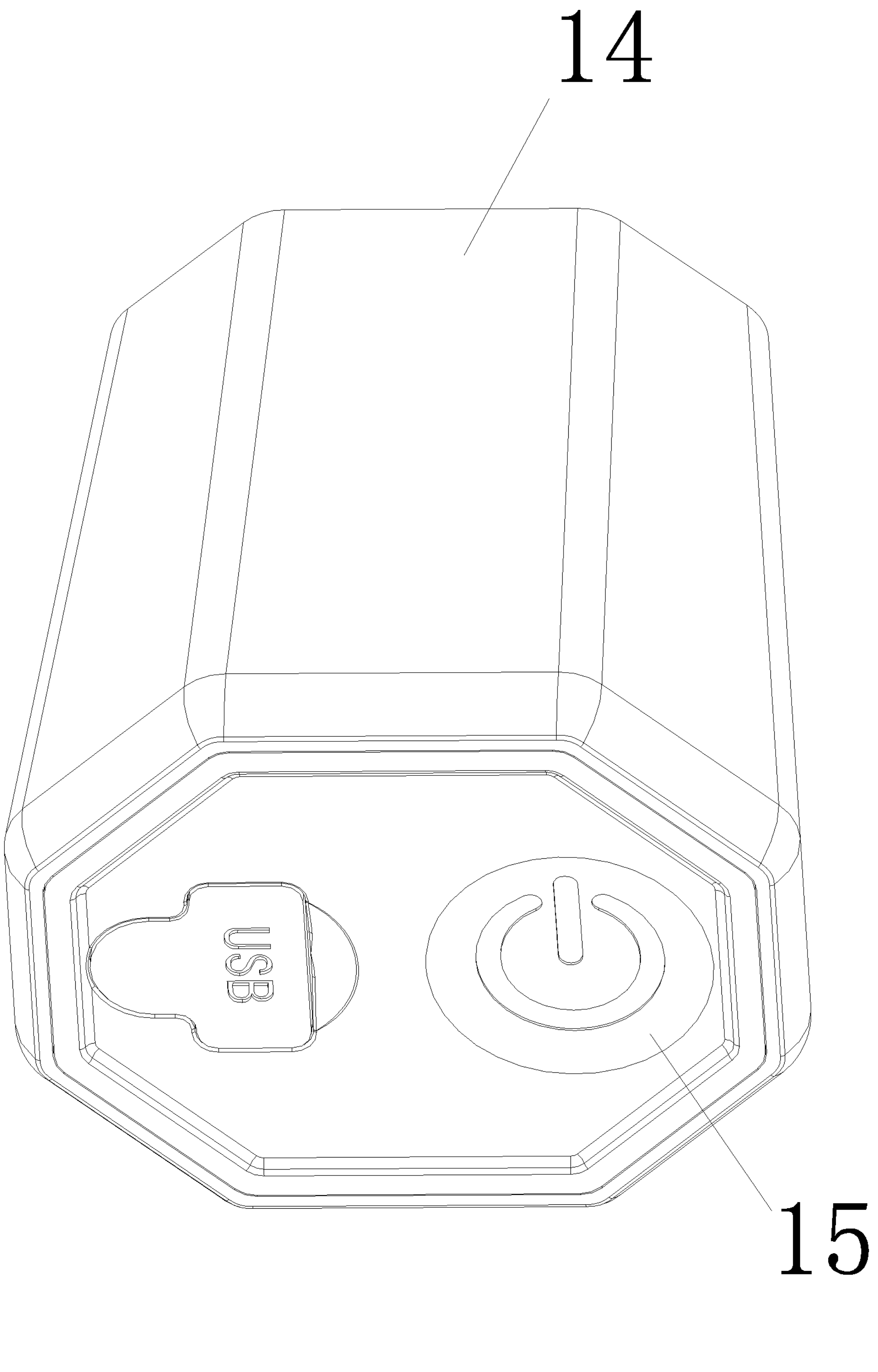
FIG. 7 is a structural schematic diagram of an end cap of Embodiment 2 in the present disclosure.

The present embodiment provides a paddle light-emitting structure, as shown in FIGS. 5-7, including a paddle plate 20, a handle 12 is mounted at a bottom end of the paddle plate 20, the end cap 14 abutting against the handle is arranged on one end of the handle 12, a switch body 15 is disposed on the end cap 14, a mounting groove 31 is formed a peripheral edge of the paddle plate 20, a flexible light-emitting assembly 32 is mounted in the mounting groove 31, a flexible lampshade 30 is arranged above the flexible light-emitting assembly 32, and the flexible lampshade 30 is adapted to the mounting groove 31 and is fixed on the paddle plate 20 by glue; the flexible light-emitting assembly 32 includes a plurality of lamp beads 33, and the lamp beads 33 are configured as multi-color lamp beads, where the paddle plate 20 is designed not to emit light, the flexible light-emitting assembly 32 adopts a light panel with a certain degree of flexibility, a length of the light panel matches a length of the flexible lampshade 30, the lamp beads 33 on the flexible light-emitting assembly 32 illuminate outwardly, and after being lighted up, the light illuminates through the flexible lampshade 30, making the entire perimeter of the paddle plate 20 shinning, which is very beautiful and cool.

Working principles of the present disclosure are as follows:

When the present disclosure is in use, it is only necessary to touch the switch body 15, since the switch body 15 is electrically connected with the circuit board 19, the circuit board 19 is provided with a lighting control chip and an adapted control circuit (the control technology is the prior art, and will not be described in detail here), the lamp beads are configured as multi-color lamp beads, when the lamp beads 33 on the flexible light-emitting assembly 32 are lighted up, the switch body 15 can be used to adjust different light colors and light flashing modes, which is very beautiful and bring a better experience, and is conducive to strengthening market competition.

In the accompanying drawings of the embodiments disclosed in the present disclosure, only the structures related to the disclosed embodiments are provided, and other structures can refer to the usual design. Under the condition of having no conflict, the same embodiments and different embodiments of the present disclosure can be combined with one another.

The foregoing descriptions are merely exemplary embodiments of the present disclosure, and not intended to limit the present disclosure. Any modifications, equivalent substitutions, and improvements made within the spirit and principle of the present disclosure shall fall within the protection scope of the present disclosure.

What is claimed is:

1. A light-emitting structure of a paddle, comprising a paddle body, wherein the paddle body comprises a paddle plate assembly and a handle mounted below the paddle plate assembly;

the paddle plate assembly comprises a paddle plate, a light-transmitting or light-proof flexible lampshade is arranged on a side of the paddle plate, and the flexible lampshade extends to the bottoms on both sides of the handle;

a mounting groove is formed on an inner side surface of the flexible lampshade or a perimeter of the paddle plate, and a flexible light-emitting assembly is mounted in the mounting groove;

the flexible light-emitting assembly comprises a plurality of lamp beads, and the lamp beads are specifically configured as single-color lamp beads or multi-color lamp beads; and the handle comprises an end cap and a switch body, the handle is provided with at least one battery cavity, and a battery is installed inside the battery cavity.

2. The light-emitting structure of a paddle according to claim 1, wherein two sides of the handle are provided with slots.

3. The light-emitting structure of a paddle according to claim 1, wherein the paddle body further comprises a circuit board mounted inside the handle, and the switch body, the battery, and the flexible light-emitting assembly are all electrically connected with the circuit board.

4. The light-emitting structure of a paddle according to claim 1, wherein the battery cavity can further be disposed on any side of the front or back of the paddle plate.

5. The light-emitting structure of a paddle according to claim 1, wherein the switch body is any one of a touch switch, a button switch, or a toggle switch.

6. The light-emitting structure of a paddle according to claim 1, wherein a charging port is provided outside the handle.

7. The light-emitting structure of a paddle according to claim 1, wherein the switch body can further be disposed on any side of the front or back of the paddle plate.

8. The light-emitting structure of a paddle according to claim 1, wherein the paddle plate is made from any one of glass fiber, carbon fiber, wood, and plastic.

9. The light-emitting structure of a paddle according to claim 1, wherein the flexible light-emitting assembly is a light string, or a light panel, or a light strip with a certain degree of flexibility.

10. The light-emitting structure of a paddle according to claim 1, wherein a length of the flexible light-emitting assembly equals to or is less than that of the flexible lampshade.

* * * * *